(12) United States Patent
Van Dosselaer

(10) Patent No.: US 11,228,554 B2
(45) Date of Patent: Jan. 18, 2022

(54) METHOD AND SYSTEM FOR HANDLING MESSAGES IN A HEALTHCARE COMMUNICATION NETWORK

(71) Applicant: Agfa Healthcare GmbH, Bonn (DE)

(72) Inventor: Bart Van Dosselaer, Mortsel (BE)

(73) Assignee: AGFA HEALTHCARE GMBH, Bonn (DE)

(*) Notice: Subject to any disclaimer, the term of this patent is extended or adjusted under 35 U.S.C. 154(b) by 60 days.

(21) Appl. No.: 15/775,025

(22) PCT Filed: Nov. 14, 2016

(86) PCT No.: PCT/EP2016/077545
§ 371 (c)(1),
(2) Date: May 10, 2018

(87) PCT Pub. No.: WO2017/085001
PCT Pub. Date: May 26, 2017

(65) Prior Publication Data
US 2018/0287988 A1    Oct. 4, 2018

(30) Foreign Application Priority Data
Nov. 16, 2015 (EP) .................................. 15194699

(51) Int. Cl.
*H04L 12/58* (2006.01)
*H04L 29/08* (2006.01)

(52) U.S. Cl.
CPC .............. *H04L 51/26* (2013.01); *H04L 67/12* (2013.01)

(58) Field of Classification Search
CPC ............................... H04L 51/26; H04L 67/12
See application file for complete search history.

(56) References Cited

U.S. PATENT DOCUMENTS

| 8,015,256 B2 | 9/2011 | Pacheco | |
|---|---|---|---|
| 2007/0064703 A1* | 3/2007 | Hernandez | H04L 67/327 370/392 |
| 2007/0118601 A1* | 5/2007 | Pacheco | H04L 51/26 709/206 |
| 2008/0021709 A1* | 1/2008 | Greer | G16H 40/20 704/258 |

(Continued)

FOREIGN PATENT DOCUMENTS

| EP | 1 927 221 B1 | 11/2013 |
|---|---|---|
| WO | 2015/164776 A1 | 10/2015 |

OTHER PUBLICATIONS

Official Communication issued in International Patent Application No. PCT/EP2016/077545, dated Feb. 9, 2017.

(Continued)

*Primary Examiner* — Umar Cheema
*Assistant Examiner* — James Ross Hollister
(74) *Attorney, Agent, or Firm* — Keating & Bennett, LLP

(57) ABSTRACT

A method and system for parallel processing of data messages in a healthcare communication network for coordinating concurrent processing of messages between computer systems over a network. The method and system include determining if a precondition for immediate processing of a message for a clinical workflow type exists, and whether or not the precondition is fulfilled, by looking up a message type and a workflow type of the message in a preconditions table database.

8 Claims, 5 Drawing Sheets

(56) References Cited

U.S. PATENT DOCUMENTS

| | | | | |
|---|---|---|---|---|
| 2015/0149196 A1* | 5/2015 | Ohad | .................... | G16H 70/00 |
| | | | | 705/2 |
| 2015/0310176 A1* | 10/2015 | Chen | .................. | H04L 12/1895 |
| | | | | 705/2 |
| 2016/0063191 A1* | 3/2016 | Vesto | .................... | G16H 50/50 |
| | | | | 705/2 |

OTHER PUBLICATIONS

Official Communication issued in Chinese Patent Application No. 201680066924.9, dated Jun. 30, 2020.

\* cited by examiner

| Message type | precondition | Used message content |
|---|---|---|
| A28 | - | - |
| A01 | A28 | Patient ID |
| A02 | A01 | Case ID |
| A03 | A02 | Case ID |
| ... | ... | ... |

Fig 4

METHOD AND SYSTEM FOR HANDLING MESSAGES IN A HEALTHCARE COMMUNICATION NETWORK

CROSS REFERENCE TO RELATED APPLICATIONS

This application is a 371 National Stage Application of PCT/EP2016/077545, filed Nov. 14, 2016. This application claims the benefit of European Application No. 15194699.3, filed Nov. 16, 2015, which is incorporated by reference herein in its entirety.

BACKGROUND OF THE INVENTION

1. Field of the Invention

The present invention relates generally to the handling and routing of electronic information messages communicated between information system components in a hospital over a communication network.

2. Description of the Related Art

In healthcare environments the information communicated containing clinical information about patients and their treatment steps are nowadays communicated over electronic communication networks. The information is in many cases transported in information messages or other data containers such as data files or data streams, and is communicated typically between the different services of a hospital, or even between different hospitals. The handling of the messages has to be dealt with carefully and efficiently as the messages may play a role in critical processes.

For example, a healthcare delivery system such as a hospital or a hospital department receives messages of very different types, but they all need to be dealt with in a reliable and appropriate way. It is critical for a good operation of the hospital that messages are delivered to the appropriate medical staff or the appropriate destination, with no loss of information. Currently, a hospital is likely to include different message handling resources for the different types of messages the hospital may deal with. A few examples of these handling resources are telephone systems, e-mail systems or other systems handling messages of some sort. The different type of messages which may be considered here in this context are email messages, but also electronic and encoded intersystem communication messages. In the context of this invention we are considering the latter very specifically.

When messages are exchanged between systems, it can be important—vital even—that they are processed in the correct order. Wrong processing may lead to incomplete patient records, orders or results not getting through in a timely manner, and may cause hazardous situations for the patient.

In many cases, data is created or entered as one step in an administrative or clinical workflow, and is then distributed to a next system (or multiple systems) which use this information as its full or partial input. Today, many different hospital workflows have been described in a standardized way. As such, a harmonization has taken place on the data exchange protocols and workflow definitions. As an example, HL7 describes the integrated radiology workflow in a hospital as a widely adopted standard.

There are a number of causes for messages not getting processed in the correct order, and these causes are spread across different layers of the OSI model. It can be due to network-related issues, but also because the sending system did not send out the messages in the correct order to begin with.

The most conservative approach for dealing with this issue is to process messages sequentially. Sequential processing requires that all messages which are required to perform (and finish) a complete workflow are assumed to arrive in the correct order, and one at a time. A next message can only be sent as soon as a previous workflow step is completed. If a message arrives in a wrong order at the module which is supposed to process the message, this message simply will be ignored or the module will block. The problem with this approach is that as soon as an error occurs at some level, the entire workflow, or even the entire system locks up and requires that an administrator intervenes to take the appropriate corrective action.

Strict sequential processing of messages has the least risk of wrongly processing message sequences, but puts a burden on the sending system and on the entire network layer. The main downside is that sequential processing slows down the whole interoperability of a system, as almost inevitably wrong message sequence events will lead to messages getting queued up waiting to be processed. This has then a significant impact on the message processing speed. Potentially the whole queue could get locked up due to a single message which fails to process.

In the field of automatic routing, various techniques have been proposed, many of which deal with other problems then described above, such as for instance the correct and efficient determination of the destination of a message. It has been established that a common routing interface for different sending and receiving systems of messages would be advantageous. A system which can correctly receive multiple types of messages from different sending systems and can determine the correct destination has been described in EP1927221B1. This disclosure however does not deal with the problem of messages not getting ordered correctly for smooth processing by the interface.

Other methods have been described in the art such as is the case in U.S. Pat. No. 8,015,256, where an improved processing method of messages is achieved by pairing related messages based on a message identifier associated with each message, and then determining the processing order for both related messages through the definition of a sequence indicator associated with each message. The processing status of the first message is being monitored, preventing the processing of the second related message, while the processing of the unrelated message is not prevented. However, the pairing of the related messages is done only based on the determination of the similarities of the unique ID of the messages in question, which under the real circumstances of an HL7 workflow is not always workable since the different messages may originate from different sending systems not providing the matching unique ID's required by this method.

US application US2008021709 A1 discloses a real-time voice, text, and messaging communications system which employs application triggers for communications. The system provides communication between an executable application and a worker, and relies on a similar mechanism as disclosed in this invention and prioritizes different messages according to their urgency for processing based on an analysis of the parameters stored in the electronic message.

SUMMARY OF THE INVENTION

Preferred embodiments of the invention propose a method and interface system for handling messages in a healthcare communication network between information system components, as set out below. The system and method are intended to optimize the concurrent processing of messages, based on the message content and a set of predefined processing order rules determined for each anticipated workflow. In practice, this system can be used for ensuring that incoming messages which are part of a workflow from any third-party system are processed in the correct order. Since not all messages are related to one another, the system can decide which messages can be processed in parallel, effectively having a safe way to process unrelated messages concurrently while maintaining the correct processing order between related messages.

The above-described aspects are solved by a method as set out below.

This invention disclosure describes the message handling in a healthcare communication network between information system components. In the context of this invention, the information system components (IS components) are computer systems which either send messages as output data or receive messages as their input data. The IS's envisaged may be IS's (Information Systems), CIS (Clinical Information Systems), LIS (Laboratory Information Systems), RIS (Radiology Information Systems) or other information systems used in a clinical environment. The information systems referenced are a collection of often very disparate systems which fulfil different tasks, but which may be interconnected in order to ensure integrity of the patient data used within the different IS components. The IS components may support different workflow types, for example supporting clinical workflows managed within different hospital departments, such as radiology, OR, . . . , supporting administrative workflows (taking care of the ADT (admission-discharge-transfer) workflow, the order entry, the bed assignment on a ward, the billing and invoicing, . . . ) or alike.

For one patient, certain data may be shared across the different information systems, but are nevertheless centrally managed by one system component, which can be considered as the master source of this data. The hospital workflows interacting or requiring this data as input will interact with this system component. In this scenario, it is necessary to transfer certain pieces of patient information to other systems upon request. The precondition for this to be possible is, of course, that this information is available on the source system at the right moment.

In this invention, the healthcare communication network is a network to which the above mentioned IS components are connected, and through which each of the components can communicate. The type of communication network is not of importance, but is not limited to a wired or wireless Ethernet network, the internet or an intranet.

The messages which are being handled by the embodiments of this invention, are digital formatted data messages. Each message is characterized by a purpose for which it is constructed, and the data payload which it carries. A message also always has a source and a destination. In the case of our invention, the source of the message is the so-called sending information system component or source system, the destination is the interface system described in this invention.

As an example, an ADT message is one of the most common messages in HL7. It covers a lot of use cases such as admissions, cancellation of admits, merging of patient data etc. This is the reason why there is such a long list of possible events/message types that could be sent.

The following is a truncated list of possible events associated with an ADT message to illustrate the large number of use cases:

| Segment ID | Description |
| --- | --- |
| A01 | Admit/visit notification |
| A02 | Transfer a patient |
| A03 | Discharge/end visit |
| A04 | Register a patient |
| A05 | Pre-admit a patient |
| A06 | Change an outpatient to an inpatient |
| A07 | Change an inpatient to an outpatient |
| . . . | . . . |

In the case of an admission into a hospital, you would need to know the name of the patient and some demographics like date or birth, gender, any next of kin and their info in case there are any significant problems, an identifier like an medical record number, where the patient is admitted into (room, bed), who was the attending physician who signed off on the admit, and the reason for the admit. So the message that would perhaps be send from an ADT system to say a Lab system could be (in plain English)—"Patient (John A Appleseed) was admitted on Jan. 1, 2013 at 12:23 a.m. by Dr Sidney J. Good (#004777) for surgery. He has been assigned to room 2012, bed 01 on nursing unit 2000." This message would be an ADT-A01 message when looking at the table above.

The messages are thus specially encoded pieces of information which can be understood (decoded) by the intended recipient (or receiving system). The encoding is most commonly implemented at the highest level of the OSI model, i.e. at the application layer.

The purpose of the message identifies its role in a clinical or hospital workflow and is embodied by its unique message format which can be recognised by the interface described in this invention. The message interface can thus identify the message type (and consequently its purpose in the workflow) by analysing its formatting characteristics. A message typically consists of header data (which characterise the message type, the message source and destination) and payload data; the actual data to be processed.

A workflow may require that certain messages are being processed in a certain sequence; in other words, under certain circumstances it may be required that one type of message (message A) has to be processed (a process step to be completed) before the subsequent message (message B) can be processed. In this case, message A being successfully processed is a precondition for message B to be processed. So in this example, verifying whether message A has been successfully processed should be understood as being equivalent to determining if the precondition for processing message B is fulfilled.

The embodiments of the systems and methods described herein may be implemented in hardware or software, or a combination of both. However, preferably, these embodiments are implemented in computer programs executing on programmable computers each comprising at least one module component which comprises at least one processor (e.g. a microprocessor), a data storage system (including volatile and non-volatile memory and/or storage elements), at least one input device, and at least one output device. For example and without limitation, the programmable computers (referred to here as computer systems) may be a personal computer, laptop, personal data assistant, and cellular telephone, smart-phone device, tablet computer, and/or wireless device. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

The present invention can be implemented as a computer program product adapted to carry out the steps set out in the description. The computer executable program code adapted to carry out the steps set out in the description can be stored on a computer readable medium.

Specific examples and preferred embodiments are set out below.

The present invention is beneficial in that message handling between IS components are optimized in the sense that concurrent processing of messages can take place and that processing of interrelated messages is optimized insofar that such messages can be processed as soon as the respective precondition for processing is met. In practice, this system can be used for ensuring that incoming messages which are part of a workflow from any third-party system are processed in the correct order and as swiftly and reliably as possible.

The invention can also be used for outbound messaging. The same principles apply here, and that makes that the interface of the invention will guarantee a correct delivery order to third-party systems.

To take it one step further, if we send the same message to two 3rd-party systems, and one cannot process it (system A) while the other can (system B), we still have the flexibility to send further messages to the system which could process it (B), while holding back related messages for this other system (A). But, at the same time we could still send messages which are unrelated to the failed message to system A as well.

For this to work, the only requirement we would need from the $3^{rd}$ party system is a proper acknowledgement mechanism. Such an ACK mechanism is also described by HL7/IHE standards.

Another advantage of the proposed interface system is that it does not require any change to the message content. In this way, it makes the system plug-and-play, and it can be used in communication with any $3^{rd}$ party system without the need for any adaptation.

Further advantages and embodiments of the present invention will become apparent from the following description and drawings.

BRIEF DESCRIPTION OF THE DRAWINGS

FIG. 4 shows an example of the contents of a preconditions table, which is stored in a preconditions table database [102].

DETAILED DESCRIPTION OF THE PREFERRED EMBODIMENTS

In the following detailed description, reference is made in sufficient detail to the above referenced drawings, allowing those skilled in the art to practice the embodiments explained below.

Figure 1:
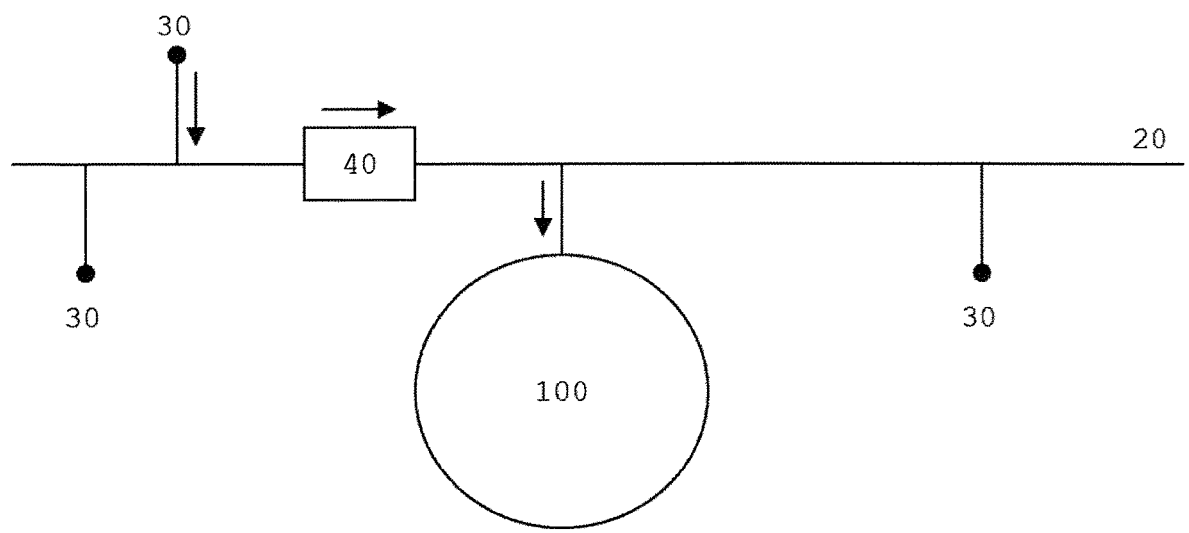
FIG. 1 depicts a diagram representing a healthcare communication network [20] to which different information system components [30] are connected by means of network connection. A message [40] is sent from a sending IS component [30] and routed to the message routing interface [100] of this invention.

The message routing interface system ([100] of FIG. 1.) which is disclosed in this invention is connected to the healthcare communication network [20] to which also different information system components [30] are connected.

In a preferred embodiment, the communication network is a network based on standard computer network infrastructure such as (but not limited to) Ethernet, Wi-Fi, or alike. The network connections serve as transport for the messages which can be sent from a source to a destination on the network. In this context, a message can only exist when a sender and a receiver is identified, which can be any of the IS components [30] connected to the network. Said IS components may be computer systems and programs from different vendors, serving very different tasks or purposes within the hospital. The different IS components often contribute by sending multiple messages for the purpose of contributing to a single hospital workflow.

Figure 2:
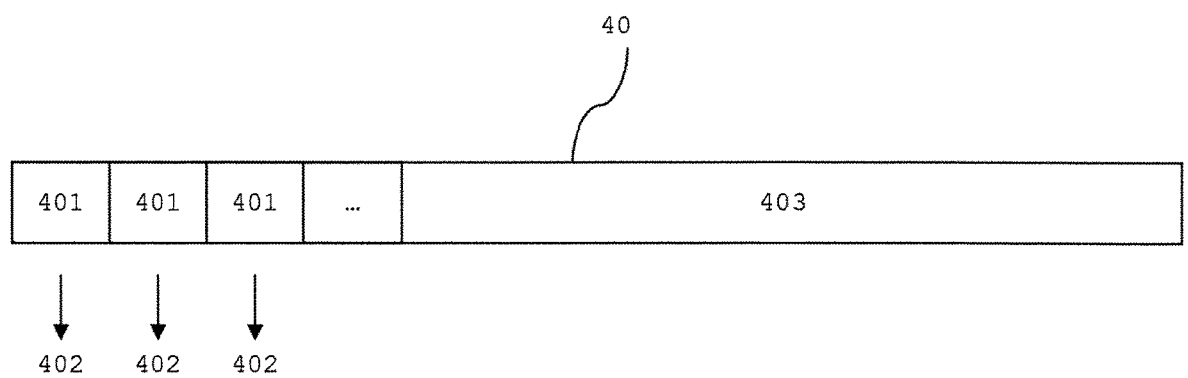
FIG. 2 is graphical representation of an example of a structure of a message which is handled by the invention disclosed in this application.

FIG. 2 shows a typical structure of a message [40] considered here in the context of this invention. A digital message is defined as any data that has been encoded. Messages are data encoded for transmission to another entity or encoded data received from another entity. The messages considered in the context of this invention are sequences of data bytes of which the structural elements (the message fields [401]) are representing parameters [402]. Said message fields are formatted in a predefined way by the sending entity in order for the receiving entity to be able to decode it. The parameter values [402] are characterising amongst others the message type of the message [40]. Subsequent parameter values may refer to key identifiers of said messages, such as the patient ID, the case ID, or alike.

As an example in a hospital context, the first message field [401] may contain a parameter value [402] of "A01", which characterises the entire message as being a message related to the "admit/visit notification" of a patient X within the hospital. The parameter with value "A01" is the so-called segment ID. The second message field [401] would in this case refer to a unique patient ID assigned to this "patient X" at the time that the message was created. The subsequent message fields [402] will in that case further comprise data related to the patient in question to which this "admit/visit notification" applies. The diagram of FIG. 2 further shows the message content payload [403] which is foreseen for including large amounts of digital data in a message. Messages may comprise digital data such as digital images, measurement data, lab results and alike.

Figure 3:
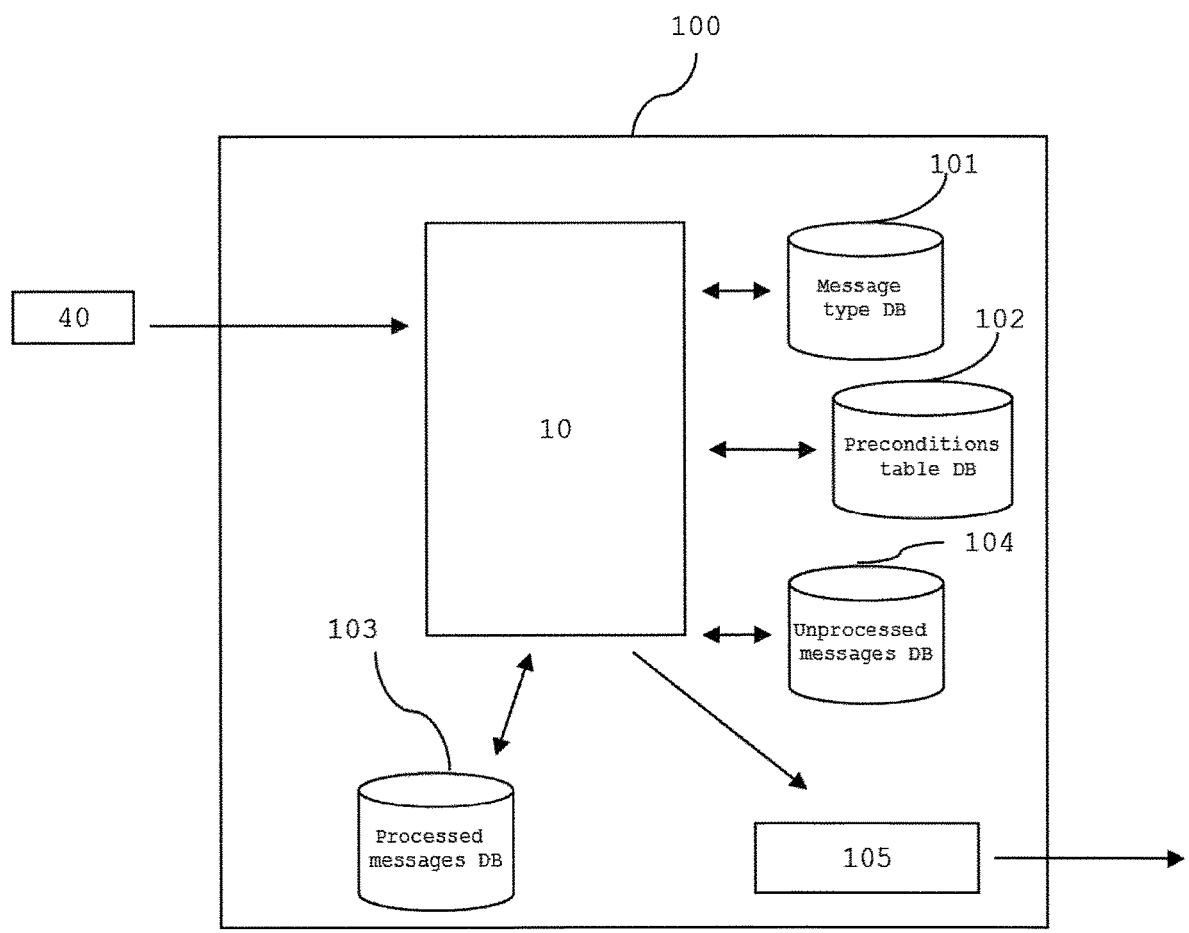
FIG. 3 is diagram of a preferred embodiment of the interface system [100] as disclosed in this invention. The system comprises a message processor [10] and an output buffer [105]. The message processor receives an incoming message [40] and is connected to a message type database [101], a preconditions table database [102], a processed messages database [103] and an unprocessed messages database [104].

FIG. 3 shows the different components of a preferred embodiment of the invention; the message processor [10] is the main processing component which is configured to be able to receive the messages from the healthcare communication network, and then to process them according to the methods disclosed in this invention. A first principle of operation of the message ordering interface is that all messages on the network are processed by said interface system [100].

Since the incoming messages arrive from very different sending systems, the formats and content of these messages may be very different. As a first step, the message processor will parse any incoming message, and will determine the message type of the incoming message through comparison of its formatting features against predefined formatting features recorded and stored in the message type database [101]. It could be envisaged that other methods for determining the message type are conceivable and could be applied, therefore the invention is not limited to the applied method described above. Once the message type is determined, the message is parsed, which means that the values [402] of the parameters stored in the message fields [401] are identified and extracted for further use during the processing of the message. As explained above, a few examples of these parameters are: the HL7 segment ID (which determines the message type in an HL7 context), patient ID (identifying the message instance which determines to which patient the message applies), patient name, case ID, prescription dosage, room number (as the actual message data required for the next workflow step).

The message type and the information about the sending system determine the type of workflow the message is intended for. The workflow type then also determines the destination of the message. Identical workflows may be concurrently active for different patients, or for different cases. These identical workflows can however be differentiated because of the differences in the object ID's which are stored in the message. An object ID indicates for which patient (patient ID) or case (case ID) the message is created.

Once the workflow type for an incoming message has been determined, the message sequence for this workflow is known. This will allow the processor to identify which message step precedes the incoming message, and whereto the message has to be routed when it is ready for processing.

Figure 5:
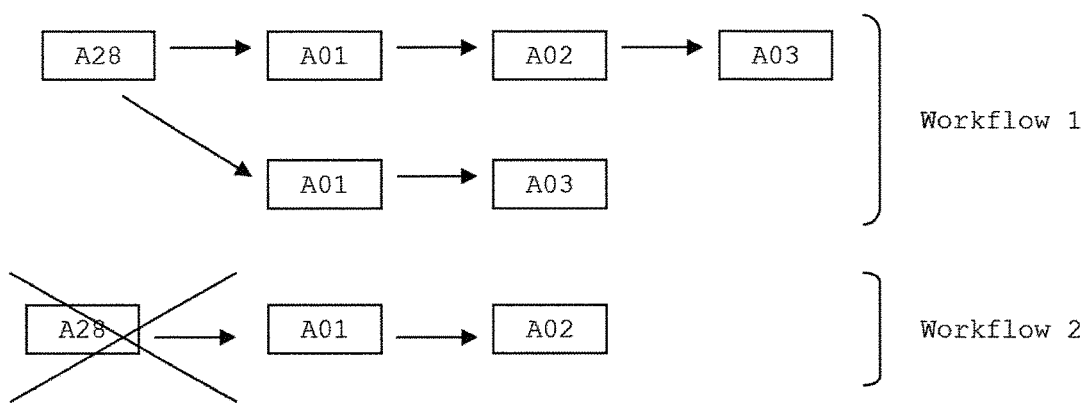
FIG. 5 is a schematic representation of a message processing sequence for a 2 different workflows. The processing sequence of "workflow 1" illustrates that 2 different message processing paths are possible within the same workflow. "Workflow 2" illustrates that a workflow may have different preconditions for processing a same message type (in this case "A01" may be processed in "workflow 2" without "A28" as a precondition, which however is a precondition for successful processing in "workflow 1"). This example illustrates the requirement to identify the workflow type before a message can be processed correctly.

There are different ways to represent and store the message sequences for a workflow. In a preferred embodiment, the message processing sequence is stored and defined by means of a precondition table database [102], which defines for each expected incoming message the precondition message(s) when relevant. An example of this kind of logic table is shown in FIG. 5, where the message types listed in column 2 (labelled "precondition") show the respective preconditions for messages in column 1 (labelled "Message type"). In another embodiment, the same data is stored in a sequence string of message types making up an entire workflow sequence (as graphically depicted in FIG. 6). Other embodiments can be envisaged where the message sequences are determined and stored by means of a file based rule-set, as opposed to the use of a database implementation. The file based rule-set being a sequentially executable set of rules which can be applied on the messages stored in an ordinary file of any format.

After the identification of the message type and workflow type, the processor [10] identifies if and which type of prior message has to be processed successfully (for a message with a same object ID, thus forming part of the same workflow) before the message which arrived at the interface can be subsequently processed. A message which needs to be processed prior to the processing of another message is a called in the context of this invention a "precondition for processing", or a "precondition". The processor thus determines if there exist one or more preconditions for the message which is to be processed.

In the case that at least one precondition exists, a check needs to be carried out by the processor to determine if the precondition has already been processed. This check is carried out by looking for the precondition in the processed messages database [103] which contains the list of already processed messages by the interface [100]. The processor thus checks if the precondition is processed.

In the positive case that the precondition was processed, the processor [10] then routes the message conditionally to the correct destination. If the precondition is found, the message can be routed without any further delay via the output buffer [105] to its destination IS component. If the precondition is not found, the message will be temporarily stored in the unprocessed messages database [104].

Some message types will not have a precondition at all, and can thus without any further delay being routed to the message destination via the output buffer [105] which forwards the messages to their destinations in an orderly and sequential way.

The net effect of this setup is that the messages without preconditions for processing, and the messages with fulfilled preconditions for processing will not be held up by messages which do have an unfulfilled precondition, and which need to be temporarily queued in the unprocessed messages database [105]. At the same time, the setup guarantees that the processing order dictated by the workflow type is respected at all times.

As a last function, the processor [10] will reprocess the unprocessed messages queue stored in the unprocessed messages database [104] when instructed (this reprocessing may be triggered by the completion of a message processing event, or could be based on a defined temporal interval, on the activity status of the processor, or by other means for instructing the reprocessing of the queue).

The functions of the message processor [10] may be carried out by multiple processors which are configured to work in parallel for concurrent processing. It should be clear that the functions of the different databases [101], [102], [103] and [104] may be implemented as a set of different tables of a single database.

The invention claimed is:

1. A method for handling messages in a healthcare communication network between information system components, the method comprising the steps of:
   receiving a message within the healthcare communication network;
   receiving the message in one of a plurality of message formats by at least one message processor;
   parsing the message to determine values for a set of message fields including parameters of the message and a message content payload, the parameters of the message including a message type of the message and a patient identifier, the patient identifier identifying a patient for which the message was created;
   determining the message type of the message by comparing the parameters with a set of predefined reference parameters stored in a message type database;
   determining a clinical workflow type for the message based on the message type of the message and information about a sending information system that sent the message, wherein the information about the sending information system is included in header data of the message, and the clinical workflow type includes at least one sequence of different message types to define at least one sequence in which messages of the different message types are to be processed;
   determining if a precondition for immediate processing of the message according to the at least one sequence of different message types defined by the clinical workflow type for the message exists by looking up the message type in a preconditions table database, the precondition being a message type of a prior message with a same patient identifier which is to be processed prior to the message being processed;
   identifying, by the processor, if the message type of the prior message with the same patient identifier must be processed successfully before the message is able to be subsequently processed; and
   determining if the precondition exists and is fulfilled such that:
      when the precondition is fulfilled, then processing the message without further delay; and
      when the precondition is not fulfilled, storing the message in a waiting queue for later processing; wherein
   processing of messages without preconditions is not delayed by messages which do have an unfulfilled precondition, and
   the preconditions table database is stored in a memory as a processing sequence data array representing the at least one sequence of different message types for the clinical workflow type and interpreted by the at least one processor.

2. The method according to claim 1, wherein the step of determining whether the precondition exists and is fulfilled is determined by looking up if a precondition message for a message related to a same patient is present in a processed messages database.

3. The method according to claim 1, wherein the step of determining whether the precondition exists and is fulfilled is determined by executing a file-based rule set.

4. The method according to claim 1, wherein the step of determining the message type of the message includes looking up a series of keywords in the message content payload of the message which are stored in the message type database.

5. A computer processing system for handling messages within a healthcare communication network, the system comprising:
   a network communications interface permitting communications between the computer processing system and the healthcare communication network;
   a message processor coupled to the network communication interface, wherein the message processor is configured or programmed to:
      receive a message within the healthcare communication network;
      receive the message in one of a plurality of message formats;
      parse the message to determine values for a set of message fields including parameters of the message and a message content payload, the parameters of the message including a message type of the message and a patient identifier, the patient identifier identifying a patient for which the message was created;
      determine the message type of the message based on a comparison of the parameters with a set of predefined reference parameters stored in a message type database;
      determine a clinical workflow type for the message based on the message type of the message and information about a sending information system that sent the message, wherein the information about the sending information system is included in header data of the message, and the clinical workflow type includes at least one sequence of different message types to define at least one sequence in which messages of the different message types are to be processed;
      determine if a precondition for immediate processing of the message according to the at least one sequence of different message types defined by the clinical workflow type for the message exists by looking up the message type in a preconditions table database, the precondition being a message type of a prior message with a same patient identifier which is to be processed prior to the message being processed; and
      identify if the message type of the prior message with the same patient identifier must be processed successfully before the message is able to be subsequently processed; wherein
   when the precondition exists, determining if the precondition is fulfilled or not:
      when the precondition exists, the message is processed without further delay;
      when the precondition does not exist, the message is stored in a waiting queue for later processing, wherein
   processing of messages without preconditions is not delayed by messages which do have an unfulfilled precondition, and the preconditions table database is stored in a memory as a processing sequence data array representing the at least one sequence of different message types for the clinical workflow type and interpreted by the message processor.

6. The system according to claim 5, wherein the processor is configured or programmed to determine if a precondition message for a message related to a same patient is present in a processed messages database.

7. The system according to claim 5, wherein the processor is configured or programmed to determine if the precondition is fulfilled by executing a file-based rule set.

8. The system according to claim 5, wherein in order to determine the message type of the message, the processor looks up a series of keywords in the message content payload of the message stored in a message type database.

* * * * *